(12) United States Patent
O'Dell (10) Patent No.: US 11,119,903 B2
(45) Date of Patent: Sep. 14, 2021

(54) RACE CONDITION TESTING VIA A SCHEDULING TEST PROGRAM

(71) Applicant: Fastly, Inc., San Francisco, CA (US)

(72) Inventor: Devon O'Dell, Rodeo, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 14/702,057

(22) Filed: May 1, 2015

(65) Prior Publication Data
US 2016/0321103 A1 Nov. 3, 2016

(51) Int. Cl.
*G06F 11/36* (2006.01)
*G06F 9/48* (2006.01)
*G06F 9/50* (2006.01)
*G06F 9/52* (2006.01)

(52) U.S. Cl.
CPC ............ *G06F 11/3688* (2013.01); *G06F 9/48* (2013.01); *G06F 9/4881* (2013.01); *G06F 9/50* (2013.01); *G06F 9/5005* (2013.01); *G06F 9/5011* (2013.01); *G06F 9/5027* (2013.01); *G06F 9/5038* (2013.01); *G06F 9/52* (2013.01); *G06F 9/524* (2013.01); *G06F 11/36* (2013.01); *G06F 11/362* (2013.01); *G06F 11/3604* (2013.01); *G06F 11/3612* (2013.01); *G06F 11/3636* (2013.01); *G06F 11/3664* (2013.01); *G06F 11/3668* (2013.01); *G06F 11/3672* (2013.01); *G06F 11/3684* (2013.01); *G06F 11/3696* (2013.01)

(58) Field of Classification Search
CPC .. G06F 11/36; G06F 11/3604; G06F 11/3612; G06F 11/362; G06F 11/3636; G06F 11/3664; G06F 11/3668; G06F 11/3672; G06F 11/3684; G06F 11/3688; G06F 11/3696; G06F 9/48; G06F 9/4881; G06F 9/50; G06F 9/5005; G06F 9/5011; G06F 9/5027; G06F 9/5038; G06F 9/52; G06F 9/524

See application file for complete search history.

(56) References Cited

U.S. PATENT DOCUMENTS

| | | | | |
|---|---|---|---|---|
| 2003/0131283 A1* | 7/2003 | Ur | ........................ | G06F 11/3672 714/36 |
| 2004/0123185 A1* | 6/2004 | Pierce | ................. | G06F 11/3672 714/38.13 |
| 2004/0230961 A1* | 11/2004 | Biberstein | ........... | G06F 11/3624 717/150 |

(Continued)

OTHER PUBLICATIONS

Edelstein et al, "Multithreaded Java Program Test Generation", IBM Systems Journal vol. 41, 2002, pp. 111-125.*

*Primary Examiner* — Charles M Swift (57) ABSTRACT

Disclosed herein are methods, systems, and software to enhance the testing of race conditions in programs. In one example, a method of testing race conditions in a target program with one or more concurrent processes includes generating a scheduling program based on race conditions identified in the target program, wherein the scheduling program includes order of operation rules for the one or more concurrent processes. The method further provides initiating execution of the scheduling program, and executing the target program based on the order of operation rules for the one or more concurrent processes.

14 Claims, 6 Drawing Sheets

(56) References Cited

U.S. PATENT DOCUMENTS

| | | | |
|---|---|---|---|
| 2005/0177775 A1* | 8/2005 | Qadeer | G06F 11/3608 714/38.13 |
| 2007/0074210 A1* | 3/2007 | Cohen | G06F 11/3688 718/100 |
| 2007/0245312 A1 | 10/2007 | Qadeer et al. | |
| 2008/0071853 A1 | 3/2008 | Mosier et al. | |
| 2008/0098207 A1 | 4/2008 | Reid et al. | |
| 2008/0209436 A1* | 8/2008 | Agha | G06F 11/3632 718/106 |
| 2010/0281467 A1* | 11/2010 | Arteaga | G06F 11/3684 717/126 |
| 2011/0161610 A1* | 6/2011 | Gustafsson | G06F 21/00 711/163 |
| 2011/0161962 A1* | 6/2011 | Laksberg | G06F 9/52 718/102 |
| 2012/0054756 A1* | 3/2012 | Arnold | G06F 9/4881 718/102 |
| 2012/0159495 A1* | 6/2012 | Rajagopalan | G06F 9/5066 718/102 |
| 2012/0179935 A1* | 7/2012 | Wang | G06F 11/3676 714/32 |
| 2012/0204154 A1* | 8/2012 | Li | G06F 11/3684 717/124 |
| 2012/0227051 A1* | 9/2012 | Craik | G06F 9/4881 718/104 |
| 2013/0007415 A1 | 1/2013 | Babayan et al. | |
| 2013/0326291 A1* | 12/2013 | Elserougi | H04B 17/15 714/712 |
| 2014/0068563 A1* | 3/2014 | Saltzman | G06F 11/3612 717/124 |
| 2015/0052529 A1* | 2/2015 | Benhase | G06F 9/526 718/102 |
| 2015/0161031 A1* | 6/2015 | Chea | G06F 11/3672 717/125 |
| 2015/0268992 A1* | 9/2015 | Fan | G06F 9/4843 718/106 |

* cited by examiner

RACE CONDITION TESTING VIA A SCHEDULING TEST PROGRAM

TECHNICAL BACKGROUND

A race condition is a behavior of a software system where the behavior of a program is dependent on the sequence or timing of other uncontrollable events. When the events do not happen in the order that the programmer or developer intended, the program may yield undesirable results. These undesirable results may include providing an incorrect response to a query, hanging the program preventing the program from determining a result, or other similar undesirable consequences.

In the past, applications and services have been developed that allow a user or developer of a program to test the program to determine locations of race conditions within the code. These applications, such as ThreadSanitizer, are useful in identifying races, but cannot guarantee that a race condition occurs each time the code is executed. Accordingly, the programmer may be unable to replicate a race condition to determine what results are yielded when a race occurs, and may further be unable to determine if a race condition is fixed by a modification to the code.

Overview

The technology disclosed herein enhances how race conditions are tested in a target program. In one example, a method of operating a computing system to test race conditions of a target program includes executing a scheduler program, the scheduler program comprising order of operation rules for the target program based on the race conditions. The method further provides initiating execution of the target program, wherein the target program comprises one or more concurrent processes. The method also includes executing each concurrent process in the one or more concurrent processes based on the order of operation rules for the target program.

In another implementation, an apparatus to perform testing of race conditions on a target program includes one or more computer readable media. The apparatus further includes processing instructions stored on the one or more computer readable media that, when executed by a processing system, direct the processing system to execute a scheduler program, the scheduler program comprising order of operation rules for the target program based on the race conditions. The processing instructions further direct the processing system to initiate execution of the target program, wherein the target program comprises one or more concurrent processes, and execute each concurrent process in the one or more concurrent processes based on the order of operation rules for the target program.

In a further implementation, a method of testing race conditions in a target program with one or more concurrent processes includes generating a scheduling program based on race conditions identified in the target program, wherein the scheduling program includes order of operation rules for the one or more concurrent processes. The method further provides initiating execution of the scheduling program, and executing the target program based on the order of operation rules for the one or more concurrent processes.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

In various situations, a program developer may find it necessary to test race conditions within a target program or application. To test race conditions, that are previously known or identified within the program, the developer may employ a test or scheduling program that specifies an order of operations for various concurrent processes within the application. These order of operations ensure that each of the concurrent processes within the application execute in an order specified by the developer of the test program.

For example, a target program or application may include one or more concurrent processes that are dependent on one another for proper execution of the target program. These concurrent processes, of which parallel processing threads are one example, may share resources belonging to the program as a whole, but execute as independent operations on the processing system. These resources may include variables, data stores, or other similar resources. Because the concurrent processes may share resources and data, the concurrent processes may rely on timing to ensure that the proper data is accessible to each of the concurrent processes in the program. However, if the timing is improper, the program may yield undesirable results.

To remedy this issue, a developer may generate, via user input, a test program for the target program to ensure that known race conditions within the target program are tested on each execution of the target program. This test or scheduling program, which may comprise code written in a separate language from the target program, identifies states of interest within the target program, and manages the execution of the concurrent processes in the target program based on states of interest. For instance, when a particular concurrent process reaches a state of interest, the test program may pause the particular concurrent process, while operations by other concurrent processes continue. By enforcing the order of operation and state rules, the developer may ensure that a race condition occurs in the target program and may determine the effect of the race condition on the operation of the target program. In particular, the test program may ensure that a race condition is repeatable for the target program for testing and development.

Figure 1:
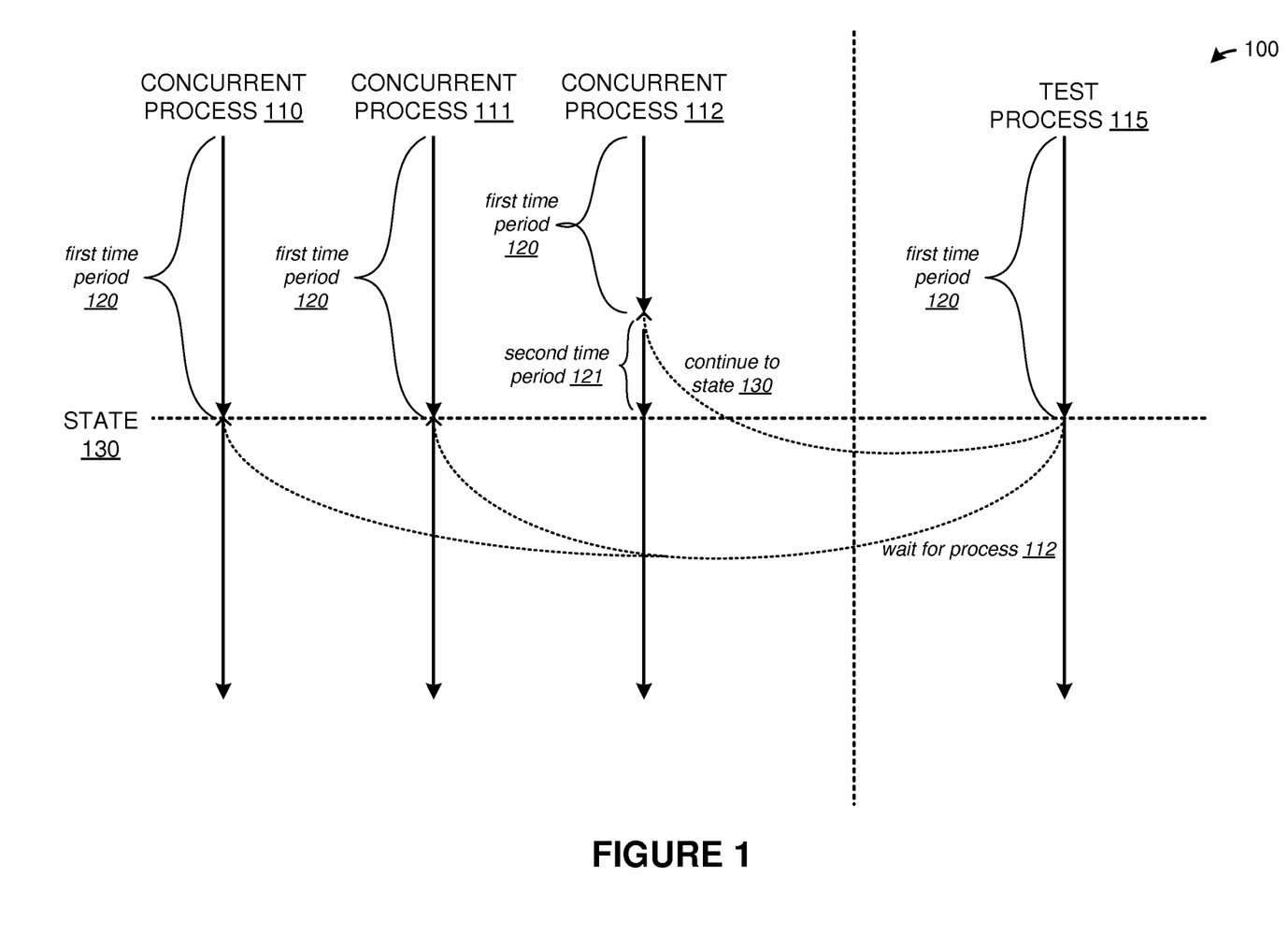
FIG. 1 illustrates an operational scenario of implementing a test program to test race conditions in a target program according to one implementation.

Referring now to FIG. 1, FIG. 1 illustrates an operational scenario 100 of executing a test program with a target program according to one implementation. Operational scenario 100 includes concurrent processes 110-112, which are representative of concurrent processes for a target program, and further includes test process 115, which is representative of a process for a test or scheduling program. The target program may be written in C, C++, C#, Java, or some other similar programming language. The test program may be written in the same programming language as the target program, or may be written in a different programming language, including a language dedicated to providing state rules for race conditions. Although described as separate programs, in some implementations, it should be understood that that test program might be implemented as a distinct test process within the target program.

As described herein, programmers and developers may identify possible race conditions within a target program, and require a method of duplicating the race conditions for testing purposes. To provide this duplication functionality, the programmer may develop a test program that executes in parallel with the target program to ensure that the race conditions occur during each execution of the target program. This test program may include order of operation rules for each of the concurrent processes in the target program. In some implementations, states of interest may be defined within each of the concurrent processes, wherein the test program enforces particular operations at the states of interest. Accordingly, the test program may cause various concurrent processes in the target program to pause, continue, delay, or implement some other operational function based on the current state.

In the present example, test process 115, which may execute as a separate test thread on a computing system, executes in parallel with concurrent processes 110-112. Concurrent processes 110-112 are representative of processes of a target program, which share processing resources such as data and variables, but execute independently of one another in a processing system. Accordingly, concurrent process 110 may use at least a subset of the same variables as concurrent process 112, although the concurrent processes operate independently of each other on the processing system. Because each of the concurrent processes may share variables or other processing data, race conditions may occur when one concurrent process does not complete an operation on the data before a second concurrent process. Consequently, any results generated during the execution of the program may be undesired when the wrong data is used.

As illustrated in FIG. 1, state 130 is defined by a developer of the target program as a state of interest within concurrent processes 110-112. This state of interest may be defined in each process of concurrent processes 110-112 using a function call, an arbitrary state flag, or some other state identifier in each of the processes. Once state 130 is defined for each process of concurrent processes 110-112, test process 115 may implement order of operation rules for concurrent processes 110-112 based on state rules and the state identifiers for state 130. In particular, test process 115 is used to pause concurrent processes 110-111 when they reach state 130, allowing concurrent process 112 to also reach state 130 before continuing the operation of the concurrent processes. For example, upon initiation of concurrent processes 110-112, concurrent processes 110-111 may reach state 130 within first time period 120, while concurrent process 112 fails to reach state 130 within the first time period. However, the developer of the program may require concurrent processes 110-112 to all reach state 130 to ensure that a race condition occurs. Accordingly, rather than permitting concurrent processes 110-111 to continue execution, the concurrent processes may be held using test process 115 until all of the concurrent processes 110-112 reach state 130. By implementing order of operation rules with the test program, race conditions may be forced without relying a on a particular set of data or input values.

Figure 2:
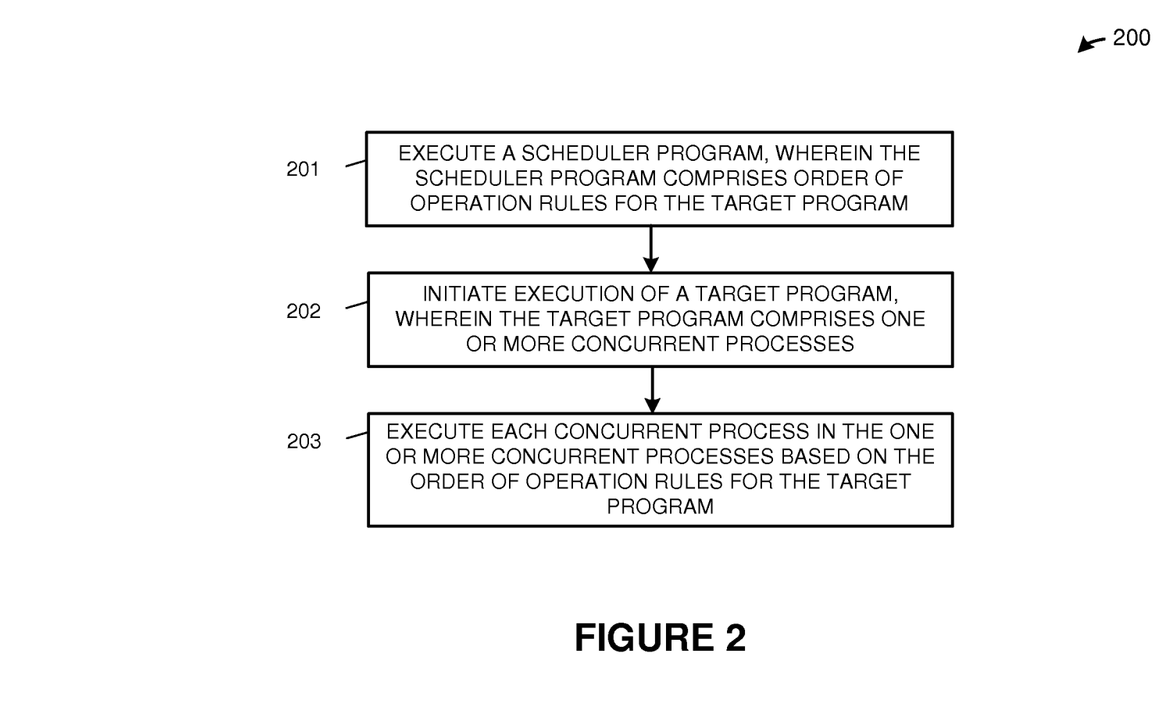
FIG. 2 illustrates a method of operating a computing system to test race conditions of a target program according to one implementation.

To further demonstrate the use of a test program in conjunction with a target program to force the occurrence of race conditions, FIG. 2 is provided. FIG. 2 illustrates a method 200 of operating a computing system to test race conditions of a target program according to one implementation. As described in FIG. 1, a developer may identify one or more race conditions that exist within a target program, and generate a test or scheduler program to be executed concurrently with the target program to force the occurrence of the race conditions. Once the scheduler program is generated, a computing system may execute the test or scheduler program, wherein the scheduler program comprises order of operation rules for the target program based on race conditions in the target program (201). The order of operation rules may comprise state rules corresponding to states of interest identified within the target program. For example, based on the states of interest identified in concurrent processes of the target program, the state rules may direct each of the concurrent processes to be paused, continued, delayed for a period of time, or some other similar action to enforce a desired order of operation for the concurrent processes.

In addition to executing the scheduler program, the method also initiates execution of the target program, wherein the target program comprises one or more concurrent processes (202). Once the target program and the scheduler program are initiated, each concurrent process of the target program is executed based on the order of operation rules for the target program (203). In some implementations, states of interest may be defined to ensure that the concurrent processes are executed in a manner that forces a race condition to occur. For example, to force a race condition, a first concurrent process may be required to reach a first state before a second concurrent process reaches a second state. Accordingly, the order of operation rules in the scheduler program may pause the second concurrent process, enabling the first concurrent process to reach the first state. Once the first concurrent process reaches the first state, the second concurrent process may continue until it reaches the second state. By implementing a scheduler program, the developer of the application may ensure that the identified race condition occurs on each execution of the target application.

Referring to FIG. 1 as an example, the race condition requires all of concurrent processes 110-112 to reach the same state before the program is allowed to continue operation. As a result, although concurrent processes 110-111 reach state 130 before concurrent process 112, the concurrent processes are paused or held until concurrent process 112 reaches the same state. By forcing specific order of operations for each of the concurrent processes, race conditions are no longer reliant on input data and variables within the target program. This allows a developer to readily replicate a race condition, without requiring a particular set of input conditions.

Although illustrated in FIG. 1 with three concurrent processes, it should be understood that any number of concurrent processes might execute as part of the target program. For example, in the case of a single concurrent process, wherein multiple operations within the process may share data and other resources, the single concurrent process may execute reads or writes out of order causing a race condition to occur. Accordingly, a developer may define states within the target program, and implement a test program that ensures specific read and write operations within the concurrent process to force the race condition.

Figure 3:
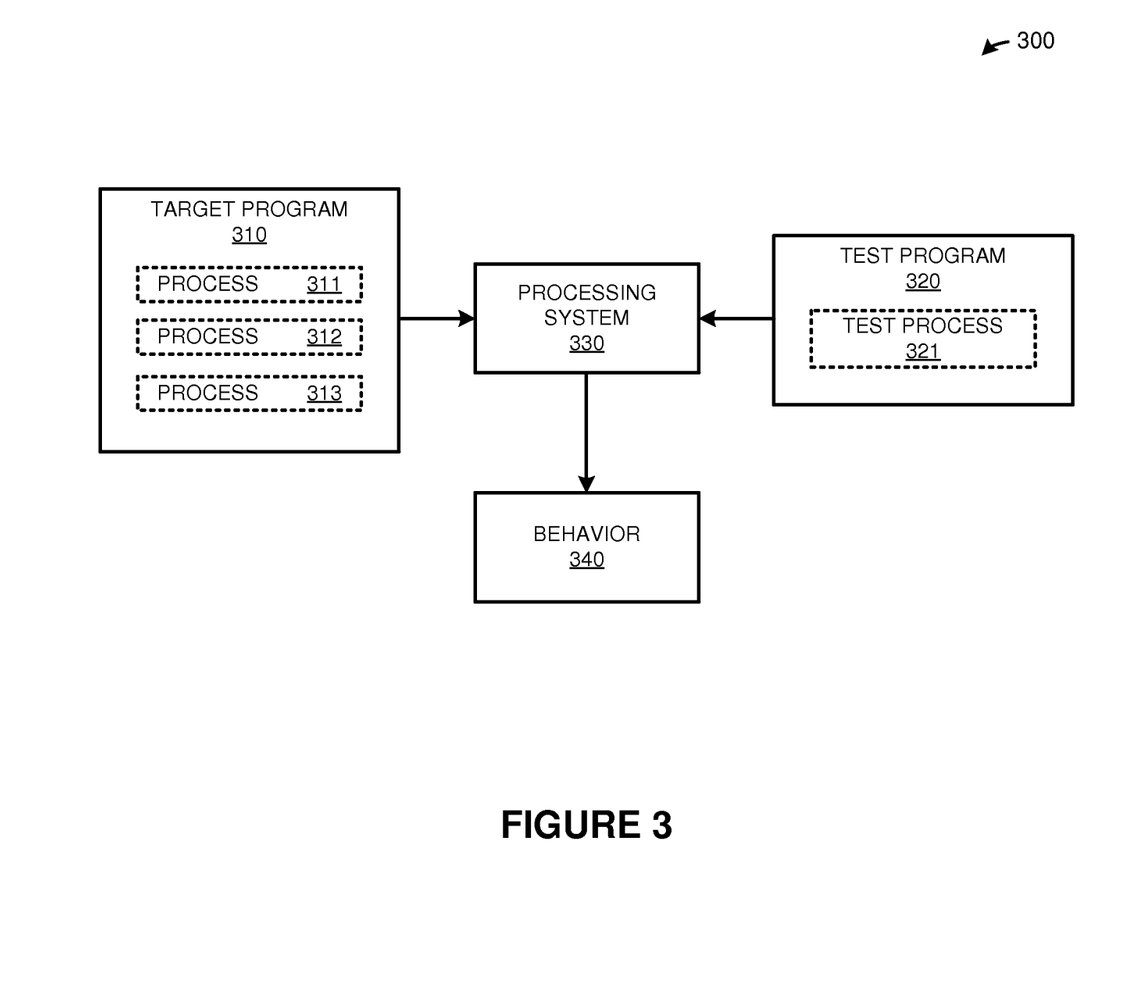
FIG. 3 illustrates an operational scenario of executing a test program with a target program according to one implementation.

Referring now to FIG. 3, FIG. 3 illustrates an operational scenario 300 of executing a test program with a target program according to one implementation. Operational scenario 300 includes target program 310, test program 320, processing system 330, and behavior 340. Target program 310 comprises a program written in any programming language to perform a desired operation, such as C, C++, Java, or some other programming language. Target program 310 includes concurrent processes 311-313, which together provide the operation for target program 310. Test program 320 comprises a program to enforce order of operation rules for target program 310, and may be written in the same language as target program 310, or in a separate language configured for enforcing states in programs with concurrent processes. Processing system 330 may comprise one or more microprocessors and other circuitry capable of compiling and executing target program 310 in parallel with test program 320 to generate behavior 340. Behavior 340 may include visual outputs, processing behaviors, storage behaviors, or any other behavior in relation to target program 310 and test program 320. Although programs in the present example, in some implementations, it should be understood that that test program may be implemented as a distinct test process within the target program.

In operation, target program 310 is created to perform a particular operation, but may include one or more race conditions that, when encountered, generate undesirable behavior for target program 310. To assist in eliminating the race conditions and to monitor the effectiveness of changes in the code of target program 310, a developer of target program 310 may generate test program 320 that enforces order of operation procedures on target program 310. In particular, when test process 321 is executed by processing system 330, test process 321 may control the operational states of concurrent processes 311-313.

In some examples, the user may define specific states within target program 310 that are of particular interest to the administrator. These states may be defined using flags, function calls, and the like within the concurrent processes to ensure the occurrence of a race condition. For example, test process 321 may be used to ensure that concurrent processes 311-313 wait for one another at a predefined state in the processing instructions of concurrent processes 311-313. Once all three of the concurrent processes reach the defined state of interest in the processing instructions, test process 321 may permit one or more of the concurrent processes to continue execution, ensuring that a race condition occurs.

In some implementations, a developer may use a race detection tool, such as ThreadSanitizer, to determine where race conditions occur within target program 310. Based on the results of the race detection tool, the developer may generate test program 320 to force the race conditions to occur during each execution of the application. This forcing of the race conditions allows the developer to test changes in the target program and ensure that the race conditions are eliminated before the program is deployed.

In some examples, the administrator may define the states manually within the target program by using function calls or other similar attributes to identify states of interest in each of the concurrent processes. These function calls, placed within the target application, may be active when test application is initiated, but may provide no operation (no-op) in the target program when the test program is inactive. In some implementations, the test program may be called from within the target program during execution. Accordingly, if the target program does not call the test program during execution, any state identifiers within the processing instructions of the target program will be bypassed as no-ops.

As illustrated in FIG. 3, processing system 330 generates behavior 340. This behavior may include information generated by target program 310, as well as information for test program 320. For example, test program 320 may cause a panic or other flags to occur when undesired actions occur within target program 310. This may occur when a concurrent process reaches a state at an undesired time, if the concurrent process never reaches a particular state, or some other issue that might be flagged by test program 320. In either example, the developer may be able to identify undesirable results that occur in response to race conditions within the application. Once the results of the condition are identified, the developer may attempt to fix the code in target program, and execute the test and target programs again to determine if the issue is resolved.

Figure 4:
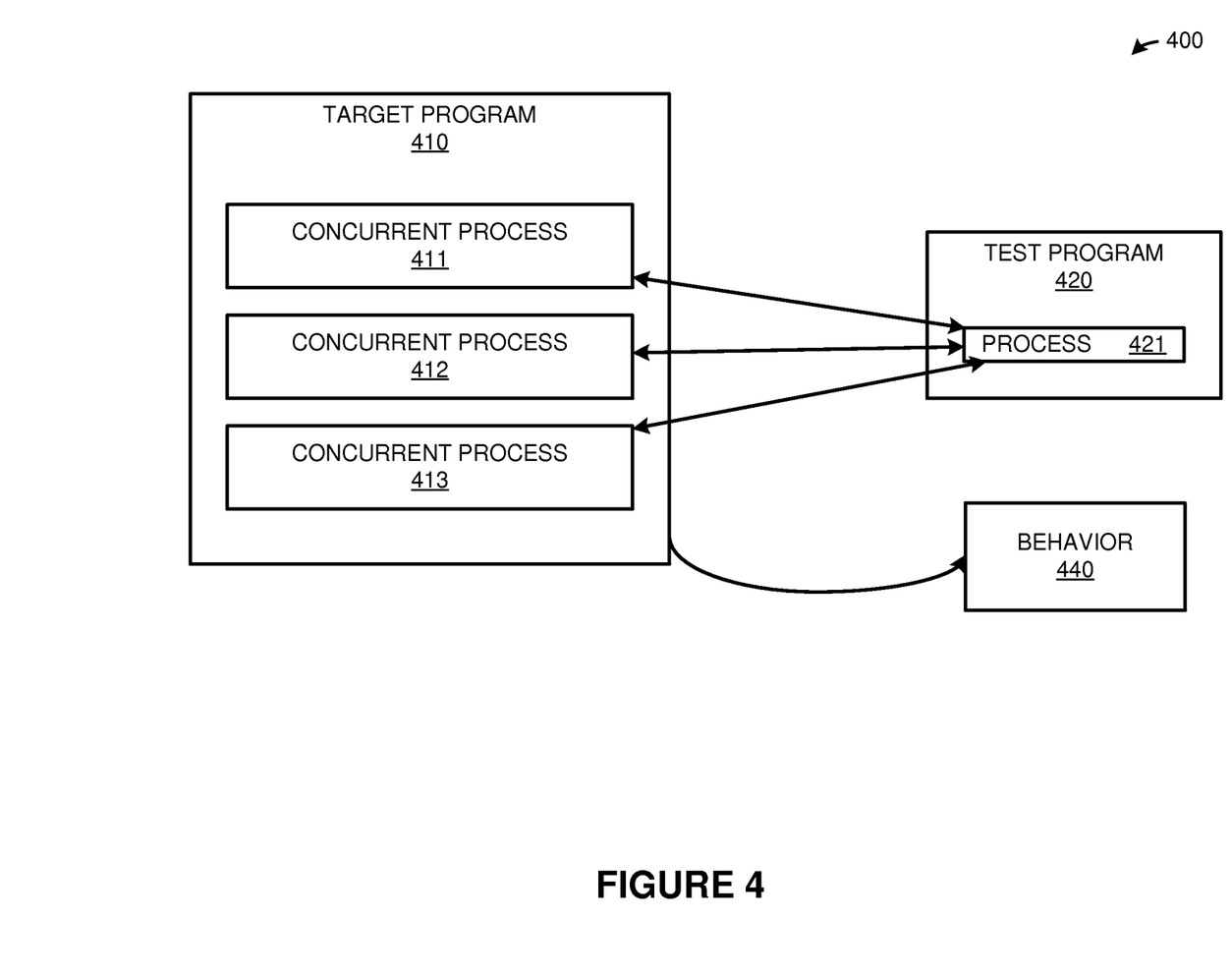
FIG. 4 illustrates an overview of applying a test program to a target program according to one implementation.

FIG. 4 illustrates an overview 400 of applying a test program to a target program according to one implementation. Overview 400 includes target program 410, test program 420, and behavior 440. Target program 410 includes concurrent processes 411-413, of which parallel processing threads are one example. Concurrent processes 411-413 may share one or more resources, such as variables or data structures, but execute independently of another on a processing system. Test program 420 includes test thread 421, which is used to monitor target program 410, and enforce developer-defined order of operation rules on target program 410.

In operation, a developer may identify one or more race conditions that exist within target program 410. These race conditions may be based on user knowledge of the processing instructions in target program 410, or may be defined by executing a race condition detector, such as ThreadSanitizer. Once the race conditions are determined, test program 420 may be generated based on the identified race conditions. In particular, test program 420 may be used to define order of operation procedures for target program 410. The order of operation procedures may comprise state rules or definitions for each of concurrent processes 411-413. For example, a state rule for target program 410 may include ensuring that concurrent process 411 holds execution at a predefined point in the code until concurrent processes 412-413 reach other predefined points in the code. Once the concurrent processes reach the predefined points, concurrent process 411 may continue its normal operation.

By managing the operation of each of the individual concurrent processes of the application, the developer may ensure that the necessary conditions are present for a race condition to occur. Accordingly, rather than relying on specific variables to force the race condition, the developer may implement delays or other similar features within the program to ensure that the race condition occurs each time the program is executed. The developer may then monitor behavior 440 to determine the possible issues associated with the race conditions. For example, results may be inaccurate because a variable was not received on time, or the program may hang as a result of the order of operations, which is undesirable for the developer of the program. Once the behavior is determined for the race condition situations, the developer may modify the code of target program 410 and reapply test program 420 to concurrent processes 411-413 to determine if the issue is eliminated.

Figure 5:
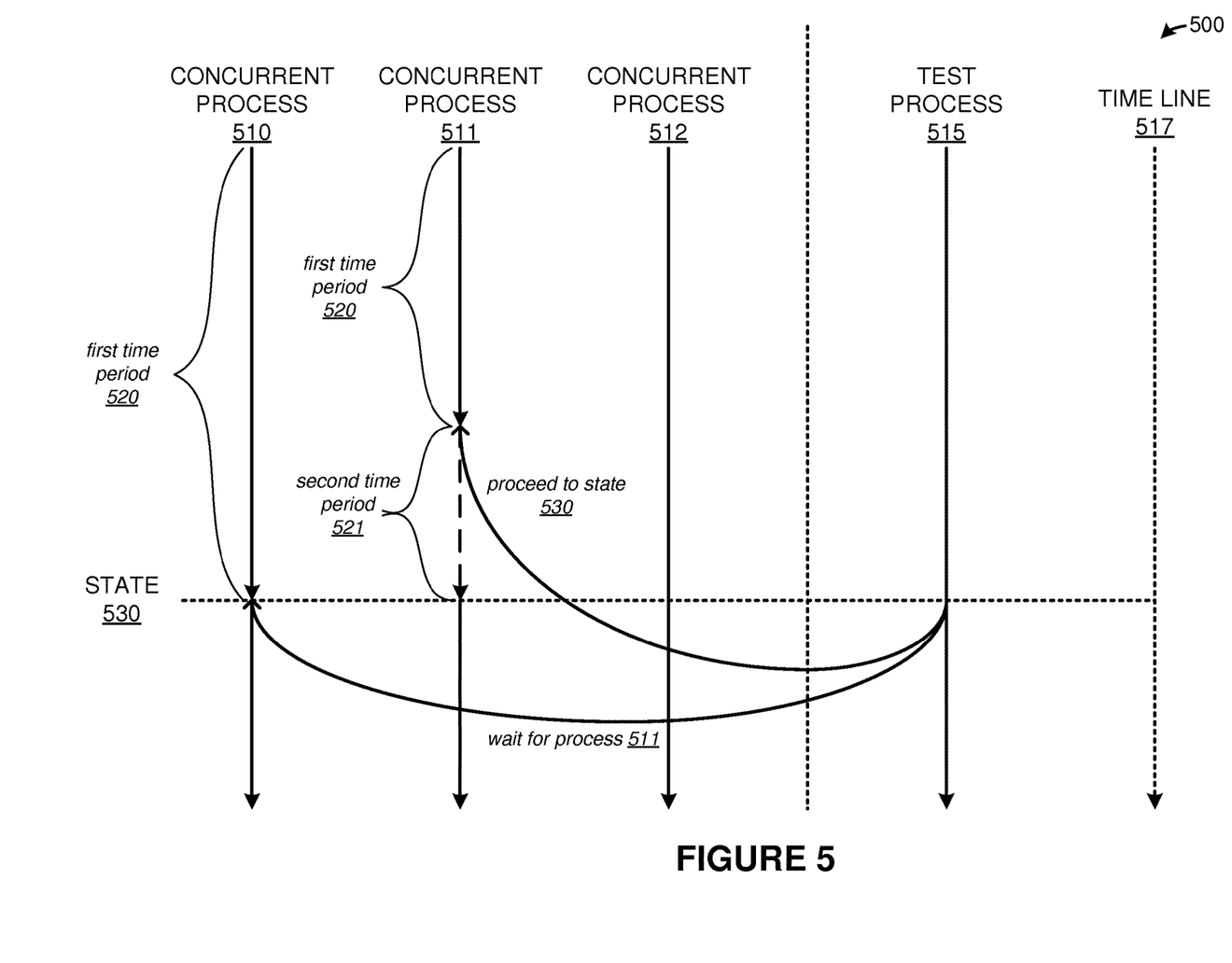
FIG. 5 illustrates an operational scenario of implementing a test program to test race conditions on a target program according to one implementation.

Referring now to FIG. 5, FIG. 5 illustrates an operational scenario 500 of implementing a test program to test race conditions on a target program according to one implementation. Operational scenario 500 includes concurrent processes 510-512, test process 515, time line 517, and state 530. Concurrent processes 510-512 are representative of concurrent processes for a target program. Test process 515 is representative of a process used for a test or scheduling program that can be processed concurrently with the target program to enforce developer-defined order of operation rules. Although described as a separate program for some examples, in some implementations, test process 515 may reside as a testing process within the target program.

As described herein, programs may include multiple concurrent processes to more efficiently process the necessary data for the application. These concurrent processes share one or more resources, but operate independently of one another in the processing system to provide the desired operation. For example, the concurrent processes may share one or more variables, or require one concurrent process to retrieve a particular data object before it can be processed by another concurrent process in the program. Here, concurrent processes 510-512 are included to provide the desired operation of the developer, but may include one or more race conditions that yield undesirable behavior. To remedy the race conditions that exist within the target program and corresponding concurrent processes 510-512, the developer may generate a test program that can be executed concurrently with the target program.

In particular, to define where the race conditions are in the target program, the developer may use their knowledge of the program to identify where, in the processing instructions for each of the concurrent processes, race conditions could occur. In addition to or in place of the user identified race condition locations, a race condition identifying tool, such as ThreadSanitizer, Microsoft CHESS, or some other similar tool may be executed on the program to determine the locations of race conditions within the processing instructions. Once the race conditions are identified, the developer may provide user input to generate a test or scheduling program that ensures one or more of the race conditions occur when the application is executed. This test program may include state rules for each concurrent process that is part of the target application, wherein the rules include pausing certain concurrent processes, continuing certain concurrent processes, initiating certain actions in concurrent processes, delaying certain concurrent processes, or any other similar action based on the state of the concurrent processes in the program. For example, to force a race condition in a program, state identifiers may be defined within each of the concurrent processes of the program. These state identifiers may be used to define states, such as state 530, and may comprise function calls, commands, or some other flag within the processing instructions of the concurrent process. Once defined, state rules with the test process may manage the order of operation of each of the concurrent processes based on the defined state identifiers and the state rules.

Referring still to FIG. 5, concurrent process 510 and concurrent process 511 are configured by test process 515 to wait until they both have reached state 530. Once concurrent processes 510 and 511 reach state 530, they are allowed to continue execution. Meanwhile, the operation of concurrent process 512 is not dependent on the states of concurrent processes 510-511, and continues operation independently of concurrent processes 510-511 and state 530. To define state 530, the developer may flag or identify a specific point in each concurrent process and associate the point with state 530. For example, state 530 may be defined for concurrent process 510, when the execution of concurrent process 510 reaches a particular function call. Similarly, state 530 may be defined for concurrent process 511 when the execution of concurrent process 511 reaches a separate function call. Pseudocode to implement the test program and test process 515 is illustrated in the example below.

```
when state 530
    concurrent process 510: wait
    concurrent process 511: wait
    concurrent process 512: continue
end
```

Specifically, the code described above defines that concurrent process 510 and concurrent process 511 must wait until the other has reached state 530. Once both have reached state 530, concurrent processes 510-511 may be permitted to continue execution. Here, although concurrent process 510 reaches state 530 in first time period 520, concurrent process 510 must wait a second time period 521 before it can continue execution.

Figure 6:
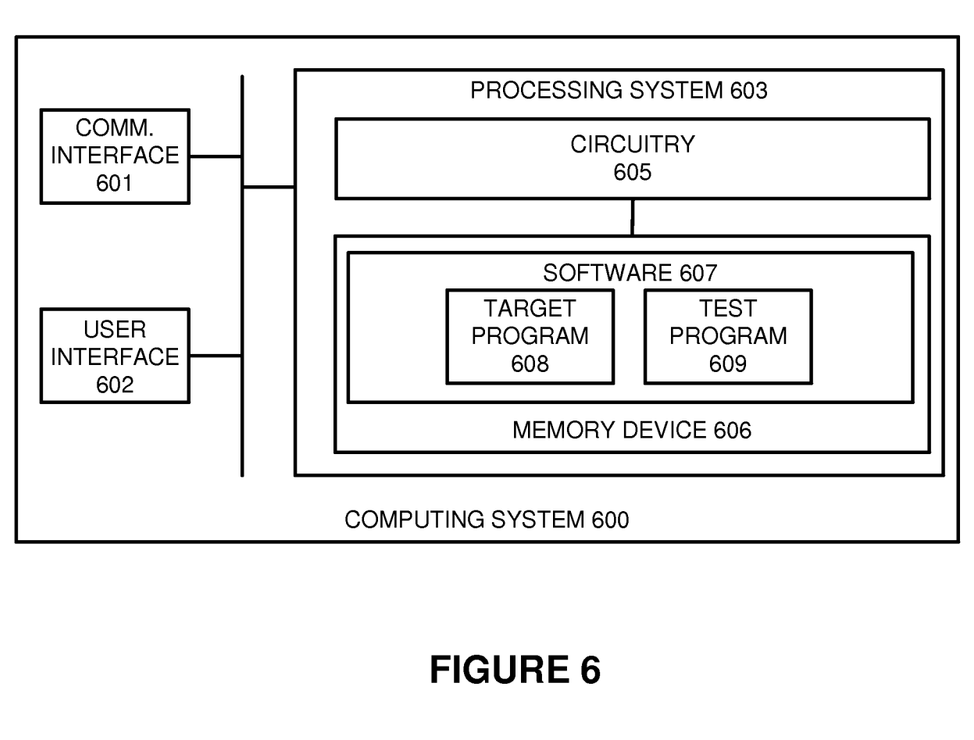
FIG. 6 illustrates a computing system to implement a test program on a target program according to one implementation.

Although the example of FIG. 5, includes a single state of interest for the target program it should be understood that the test program might define any number of states of interest. As a result, even if the program included a plurality of race conditions, each of the conditions may be tested by defining a plurality of state conditions that force the race conditions to occur independent of the variables input for the program. Further, despite being illustrated in FIG. 5 with three concurrent processes, it should be understood that any number of concurrent processes might execute as part of the target program. For example, in the case of a single concurrent process, wherein multiple operations within the process may share data and other resources, the single concurrent process may execute reads or writes out of order causing a race condition to occur. Accordingly, a developer may define states within the target program, and implement a test program that ensures specific read and write operations within the concurrent process to force the race condition Turning to FIG. 6, FIG. 6 illustrates a computing system 600 to implement a test program for race conditions on a target program according to one implementation. Computing system 600 is representative of a computing system that may be employed in any computing apparatus, system, or device, or collections thereof, to suitably execute target programs and related concurrent processes, as well as scheduling test programs and related concurrent processes described herein. Computing system 600 comprises communication interface 601, user interface 602, and processing system 603. Processing system 603 is communicatively linked to communication interface 601 and user interface 602. Processing system 603 includes processing circuitry 605 and memory device 606 that stores operating software 607.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use internet protocol (IP), Ethernet, time-division multiplexing (TDM), optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus, but in no case is the storage medium a propagated signal. Operating software 607 comprises computer programs, firmware, or some other form of machine-readable processing instructions. Operating software 607 includes target program 608 and test program 609. Operating software 607 may further include an operating system, utilities, drivers, network interfaces, applications, or some other type of software. When executed by circuitry 605, operating software 607 directs processing system 603 to operate computing system 600 as described herein.

In one implementation, target program 608 comprises a program that includes one or more race conditions that are undesirable for a developer. These race conditions occur when concurrent processes for target program 608 require a proper sequence to access data and perform the desired operation for the developer. For example, a first concurrent process for target program 608 executing on processing system 603 may require an operation on a data object before it is provided to a second concurrent process for target program 608 executing on processing system 603. However, for a variety of different reasons, the second concurrent process may require the data object before it has been operated on by the first concurrent process. These reasons may include the second concurrent process executing faster than expected by the developer, the first concurrent process executing slower than expected by the developer, or any other race inducing reason. Accordingly, target program 608 may not perform the desired operation.

In some examples, the developer may desire to guarantee that the race conditions occur each time that the target program is executed to assist the developer in eliminating race conditions from the code of target application 608. To identify the locations of race conditions, the developer may use experience or knowledge of the code to flag potential race conditions in target program 608, or may use a race condition identifying process to flag locations of possible races within the code of target program 608. Once the race conditions are determined within the code of target program 608, the developer may generate test program 609, which may be in a separate programming language than target program 608. Test program 609 includes order of operation rules for target program 608 that ensure that particular concurrent process operations occur at desired times to force the occurrence of the race conditions.

In particular, the developer may define states of interest within concurrent processes of target program 608 that are relevant to the race conditions. These states may be used to ensure a particular order of events occurs for the various concurrent processes that comprise target program 608. For example, the states could be used to ensure that a first concurrent process executes a first portion of code before a second concurrent process executes a second portion of code. In addition to the state identifiers within target program 608, test program 609 is used to define state rules for the state identifiers within target program 608.

For example, a plurality of state identifiers may be defined within the processing instructions of target program 608 and the corresponding concurrent processes. Using the state identifiers, state rules for each concurrent process of target program 608 may be defined to provide a desired order of operations. For instance, a developer may desire to have all concurrent processes of target program 608 reach a certain state before the concurrent processes continue execution.

Once test program 609 is generated and the states are identified in target program 608, processing system 603 may initiate execution of target program 608 and test program 609. Upon initiating execution of target program 608 and test program 609, target program 608 executes based on the order of operation rules defined in test program 609.

In some implementations, to initiate test program 609, a call may be placed in target program 608 for test program 609. Once called, target program 608 will pause while a thread is initiated for the test program. Once the thread is initiated, test program 609 may execute in parallel with target program 608, implementing the requested order of operations on each of the concurrent processes of target program 608. In some examples, when the call is not requested from target program 608, any code that was included in target program 608 to define states of the various concurrent processes may be treated as "no-ops," allowing execution of target program 608 to continue without interference from the test program.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing system to test one or more race conditions in a target program, wherein the target program comprises a first concurrent process and a second concurrent process, the method comprising:
   executing a scheduler program, the scheduler program comprising identifying a state of interest in the target program, wherein the state of interest in the target program comprises a first state of interest in the first concurrent process and a second state of interest in the second concurrent process;
   initiating independent execution of the first and second concurrent processes, which execute as independent operations on the computing system;
   pausing the first concurrent process when the first concurrent process reaches the state of interest, and until the second concurrent process reaches the second state of interest; and creating the race condition by continuing both the first and second concurrent processes at the state of interest in the target program.

2. The method of claim 1 further comprising receiving user input to generate the scheduler program.

3. The method of claim 1 wherein executing the scheduler program comprises initiating a thread for the scheduler program.

4. The method of claim 1 wherein executing the scheduler program comprises executing the scheduler program in response to initiating the execution of the target program.

5. The method of claim 4 wherein executing the scheduler program in response to initiating the execution of the target program comprises:
   identifying a call from the target program to execute the scheduler program; and
   in response to the call, executing the scheduler program.

6. The method of claim 5 further comprising:
   in response to identifying the call, holding execution of the target program; and
   in response to executing the scheduler program, continuing execution of the target program.

7. An apparatus to perform testing of one or more race conditions in a target program, wherein the target program comprises a first concurrent process and a second concurrent process, the apparatus comprising:
   one or more computer readable media; and
   processing instructions stored on the one or more computer readable media that, when executed by a processing system, direct the processing system to:
      execute a scheduler program, the scheduler program comprising identifying a state of interest in the target program, wherein the state of interest in the target program comprises a first state of interest in the first concurrent process and a second state of interest in the second concurrent process;
      initiate independent execution of the first and second concurrent processes, which execute as independent operations on the computing system;
      pause the first concurrent process when the first concurrent process reaches the state of interest, and until the second concurrent process reaches the second state of interest; and
      create the race condition by continuing both the first and second concurrent processes at the state of interest in the target program.

8. The apparatus of claim 7, wherein the processing instructions further direct the computing system to receive user input to generate the scheduler program.

9. The apparatus of claim 7, wherein the processing instructions to execute the scheduler program direct the processing system to initiate a thread for the scheduler program.

10. The apparatus of claim 7, wherein the processing instructions to execute the scheduler program direct the processing system to execute the scheduler program in response to initiating the execution of the target program.

11. The apparatus of claim 10, wherein the processing instructions to execute the scheduler program in response to initiating the execution of the target program direct the processing system to:
   identify a call from the target program to execute the scheduler program;
   in response to the call, execute the scheduler program.

12. The apparatus of claim 7, wherein the scheduler program and the target program comprise programs written in different programming languages.

13. A computing apparatus comprising:
   one or more computer readable storage media;
   one or more processors operatively coupled with the one or more computer readable storage media; and
   program instructions stored on the one or more computer readable storage media for load balancing requests across origin servers that, when executed by the one or more processors, direct the computing apparatus to at least:
      execute a scheduler program, the scheduler program comprising identifying a state of interest in a target program, wherein the state of interest in the target program comprises a first state of interest in a first concurrent process and a second state of interest in a second concurrent process;
      initiate independent execution of the first and second concurrent processes, which execute as independent operations on the computing apparatus;
      pause the first concurrent process when the first concurrent process reaches the state of interest, and until the second concurrent process reaches the second state of interest; and
      create a race condition by continuing both the first and second concurrent processes at the state of interest in the target program.

14. The computing apparatus of claim 13, wherein the scheduler program comprises state rules corresponding to states for each of the first and second concurrent process.

* * * * *